April 21, 1970  R. C. PRUSINSKI ETAL  3,507,738
ORNAMENTAL PANEL WITH FOAM CORE AND METHOD OF MAKING SAME
Filed Jan. 24, 1966
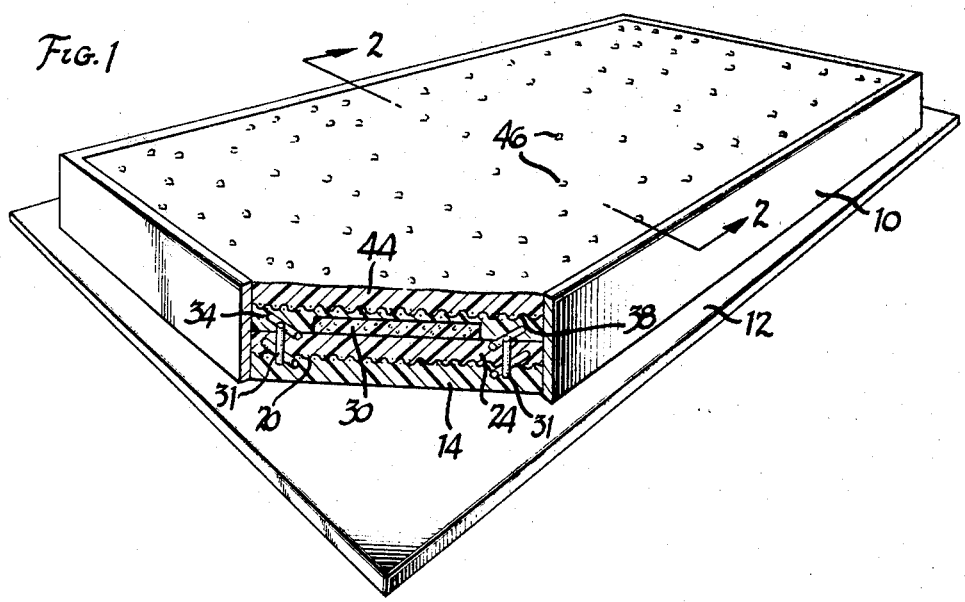
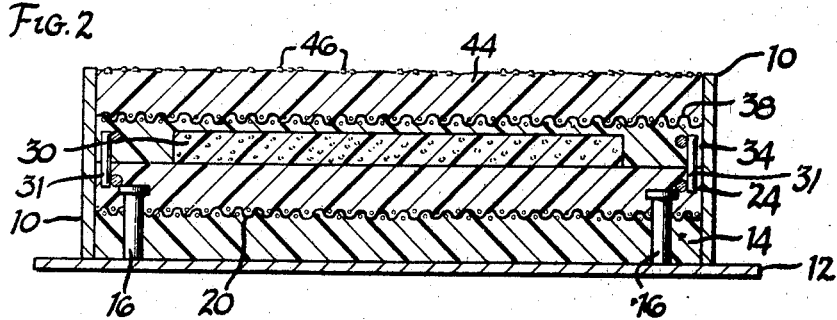
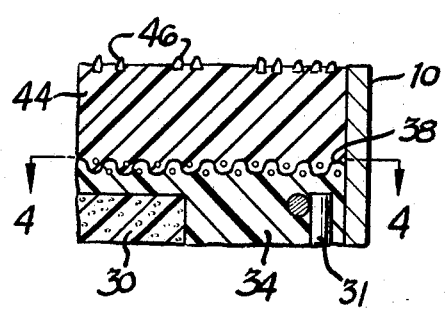
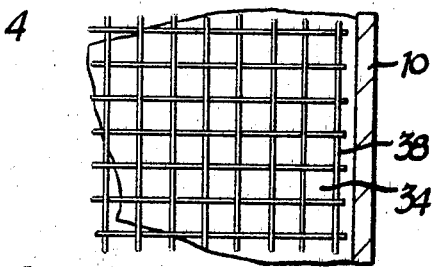
Inventors
RICHARD S. PRUSINSKI
MARCELLO FERMANI
ATTILIO TORCOLACCI
LUIGI FERMANI
Wilson, Settle & McKinnon
ATTORNEYS United States Patent Office 3,507,738
Patented Apr. 21, 1970

3,507,738
ORNAMENTAL PANEL WITH FOAM CORE AND METHOD OF MAKING SAME
Richard C. Prusinski, Dearborn, and Marcello Fermani, Attilio Torcolacci, and Luigi Fermani, Detroit, Mich., assignors to Architectural Research Corporation, Detroit, Mich., a corporation of Delaware
Filed Jan. 24, 1966, Ser. No. 522,552
Int. Cl. B29c 5/00; E04c 2/26
U.S. Cl. 161—43      3 Claims

ABSTRACT OF THE DISCLOSURE

A massive ornamental panel of a plurality of adhering layers is provided. The panel includes first and second layers of filled resinous material having a foraminous sheet at the interface thereof. A third layer of filled resinous material is provided. A mass of rigid foamed material is encased by the second and third layers. A fourth layer of filled resinous material is provided and a foraminous sheet is provided at the interface of the third and fourth layers.

BACKGROUND OF THE INVENTION

Panel constructions have been previously proposed wherein blocks of rigid foamed material were encased between matrix layers of resinous material to provide solid ribs of resinous material between the blocks for compressive strength and at the same time to provide foamed material within the resinous matrix to thermally insulate and lighten the panel. In this instance the first step in the formation of the panel was to lay a filled liquid resin into a frame to partially fill the frame and form a first resinous layer. Blocks of rigid foamed material were then impressed into the layer in spaced apart relation while the resin was still in the plastic state. Then a second layer was laid over the first layer to cover the blocks and the panel was completed by imbedding small irregularly shaped stones or ceramic pieces in the exterior surface of the second layer while it was still in a plastic state. Such a two layer system has the inherent disadvantage of being dimensionally unstable with respect to contraction and expansion occurring as a direct result of temperature variations and also of cracking and crazing resulting from fatigue, the fatigue being caused by repetitive contraction and expansion.

The present invention overcomes these problems by providing a structurally balanced ornamental panel of basic four layers construction having a rigid foam core which combines desired characteristics of dimensional stability, high strength, low weight, extreme durability and weatherability, and high stain resistance.

It is therefore an object to provide a multiple layer panel wherein the resinous layers are filled to an extent where there is negligible shrinkage thereof as they cure.

Another object of our invention is to provide an improved panel construction having layers of resinous material with filler material intermixed therein to the extent of 60 to 90 percent of the volume of the layers and provided with troweled smooth surfaces and having encased therein a mass of rigid foamed material, and having sheets of strengthening foraminous material laid between surfaces.

Another object of our invention is to provide a new method of making a panel construction which comprises utilizing resinous material intermixed with filler particles to provide a dough-like mass and encasing a mass of rigid foamed material, applying a foraminous sheet onto adjacent surfaces of the doughlike mass and applying additional like resinous material onto said sheets in the form of additional layers.

Other objects of this invention will appear in the following description and appended claims, reference being had to the accompanying drawings forming a part of this specification wherein like reference characters designate corresponding parts in the several views.

In the drawings:

FIGURE 1 is a perspective view in elevation and partly broken away of a panel construction embodying features of our invention;

FIGURE 2 is a view taken along line 2—2 of FIGURE 1 looking in the direction of the arrows;

FIGURE 3 is an enlarged view in cross section of the upper right-hand corner of FIGURE 2 as viewed in the drawing; and FIGURE 4 is a view taken along the line 4—4 looking in the direction of the arrows.

Before explaining the present invention in detail, it is to be understood that the invention is not limited in its application to the details of construction and arrangements of parts illustrated in the accompanying drawings, since the invention is capable of other embodiments and of being practiced or carried out in various ways. Also, it is to be understood that the phraseology or terminology employed herein is for the purpose of description and not of limitation.

Referring to FIGURE 1, it will be seen that the panel is formed in a rectangular frame 10 which rests on the flat surface of supporting structure 12.

The first step in the formation of the panel is to prepare a resin material having intermixed therein filler material, preferably in the amount of from 60 to 90% by volume, to form a dough-like mass and place a portion into the frame 10 to partially fill the frame and smooth the upper surface with a trowel to form a first resinous layer 14. In the embodiment shown, a plurality of internally threaded female inserts 16 are provided to receive bolts for the mounting of the finished panel. The inserts 16 are set on the support structure 12 in spaced apart relation adjacent the frame 10 before the resin is placed in the frame. As an alternate to the use of inserts 16, flat metal plates with upwardly projecting structure may be set on the support structure 12 and subsequently partially encased in the resin with the projecting structure firmly anchoring the plates to the panel. The exterior surfaces of the flat metal plates are subsequently used to weld the finished panel to a metallic support surface.

A suitable resin for use in the invention may be a polyester resin. Polyester resins consist of the reaction product of a dibasic acid and dihydric alcohol dissolved in a polymerizable monomer. The dibasic acids used in the resin solution may be phthalic anhydride, iso-phthalic acids, adipic acid, tetra-phthalic anhydride, maleic acid, fumaric acid, or itaconic acid. The dihydric alcohols in the polyester resin solution may, for example, be any glycol such as ethylene glycol, propylene glycol, diethylene glycol, dipropylene glycol, or 1-3 butylene glycol. The polymerizable monomer used in the polyester resin solution can, for example, be styrene, vinyl toluene, methyl methacrylate, or diallyl phthalate.

Various filler materials can be intermixed in the resin, as for example, small mineral particles, asbestos fibers, perlite, ground chalk, finely ground wood chips, and fiber glass wool. The filler may be combined with suitable pigments to provide a desired color in the finished panel.

The preferred filler material is small mineral particles. The particles may be, for example, sand, marble, granite or the like. Silica sand is preferred. The mineral particles serve two functions in addition to acting as an inexpensive fill. Firstly, they perform the usual function of reinforcng the resin to increase the overall strength of the panel. Secondly, and more importantly, the particles give the exterior surface of the panel a texture similar to that of concrete. The usual glossy appearance of a resin is considered objectionable in many applications, the texture of concrete being preferred. The desired texture is achieved as the result of the particles which are at or near the outer surface of the panel.

By the intermixing of 60 to 90 percent filler material by volume, preferably 80 percent, with the resinous material, a dough-like mass is provided which may be worked and smoothed by hand with the use of a trowel similar to the manner of applying plaster or cement. Additionally, vibration techniques may be employed for applying the resin. With the percentage of filler used, there is an equalization of stresses when the plastic cures and the surface remains smooth and the layer formed thereby retains its strength.

After the layer 14 is formed, and before it cures, a sheet 20 of wire screen, woven fiber glass, fiber glass mat, or other foraminous material is laid on the upper surface of layer 14 to completely overlie the plastic mass, the sheet 20 is smoothed out so that there are no wrinkles or bubbles. Such wrinkles or bubbles would tend to cause de-lamination of the layers. Another layer 24 of the same dough-like plastic mass is placed on the sheet 20. Portions of the two layers penetrate the sheet 20 and combine to cause adherence of the two layers. The upper surface of layer 24 is also smoothed.

After the layer 24 is completed, a block of rigid foam material 30 is placed on layer 24. The block 30 covers a major area of the surface but does not cover the entire surface. The block is a one piece article except in large panels where several such blocks may be placed side by side. A reinforcing steel structure 31 of ladder-like construction is then placed on all sides of the block 30 as shown in FIGURES 1, 2 and 3. Such reinforcing structure is normally used only in large panels.

Various types of foamed materials may be used to fabricate the block 30. However, foamed polyurethane or foamed glass or honeycomb are preferred materials. Foamed polyurethane is preferred for some applications in which high heat-insulation properties are desired. Foamed glass, which is a relatively strong material, is preferred when high panel strength is desired. Foamed material in comparison to the resin materials forming the matrix is relatively inexpensive. Foamed material is lighter than an equal volume of resin.

A third layer 34 of the same dough-like mass of plastic as 14 and 24 is placed over the block 30 and at the ends thereof where it adheres to layer 24. The outer surface of layer 34 is then smoothed like the other layers.

On the top of the layer 34 is placed a second sheet 38 of foraminous material. Another layer 44 of the same dough-like mass of plastic as 14, 24, and 34 is placed on top of the sheet 38 and adheres to layer 34 in the same manner as described in connection with layers 14 and 24. Small, irregularly shaped stones or ceramic pieces 46 may then be imbedded in the exterior surface of the layer 44. The pieces 46 may be such as glass, quartz, marble or granite. Alternatively, the inserts 16 may be imbedded in the outer surface of layer 44 and the bottom surface of layer 14 used as the exterior panel surface. The bottom surface of layer 14 may be left smooth or it may be textured. In some cases, stones may be imbedded in the outer surface of layer 44 and the bottom surface of layer 14 may be textured to form a finished interior surface.

FIGURE 3 is an enlarged fragmentary view showing portions of layers 34 and 44 with fiber glass 38 therebetween. FIGURE 4 is an enlarged fragmentary view of fiber glass 38 showing the juncture of layers 34 and 44 between the square openings in said fiber glass.

From the foregoing it will be noted that we have provided a durable and weatherproof four layer panel construction with the four layers being adhered together. When a layer is placed on another layer it becomes adhered thereto which results in all four layers being united. Also foraminous sheet material is stretched between the first and second layers and between the third and fourth layers and a mass of rigid foamed material is encased between the second and third layers. When the panel is completed and cured, the frame 10 and support 12 are removed.

It will be noted that the final panel has four layers, the surfaces of which are substantially parallel and the abutting surfaces of which are substantially smooth. These relationships are important because they prevent uneven expansion or contraction between the prevent uneven expansion or contraction between the layers thus forming a stress balanced sandwich structure.

Stress balancing is further enhanced in an important way by the provision of four layers. The center two layers 24, 34 tend to act as a single thick layer because there is no foraminous sheet separating these layers. The provision of a sheet of foraminous material in the outer face of each of layers 24, 34 and the provision of additional outer layers 14, 44 over the foraminous sheets results in stress balancing and prevents bowing, cracking and crazing, cold flow, warping and other undesirable factors leading to dimensional instability and panel failure.

Having thus described our invention, we claim:

1. A massive ornamental panel of a plurality of adhering layers comprising a first layer of filled resinous material and having a smooth surface, a second layer of filled resinous material and having a smooth surface adjacent the smooth surface of the first layer, a foraminous sheet at the interface of said first and second layers substantially completely overlying said interface, said sheet being free from wrinkles or bubbles, a third layer of filled resinous material and having a smooth surface, a mass of rigid foamed material encased by said second and third layers, a fourth layer of filled resinous material and having a smooth surface adjacent the smooth surface of the third layer, and a foraminous sheet at the interface of said third and fourth layers substantially completely overlying the interface, said sheet being free from wrinkles or bubbles, each of the four resinous layers having filler particles intermixed therein to the extent of 60% to 90% by volume of the layers, said sheets being of considerably less thickness than the thickness of the layers.

2. A massive ornamental panel comprising a first portion of resinous material and having a smooth surface, a second portion of resinous material and having a smooth surface, a foraminous sheet stretched between said first and second portions substantially completely overlying the interface between said portions, said sheet being free from wrinkles or bubbles, said second portion encasing a solid mass of rigid foamed material which extends substantially throughout the internal area thereof, a third portion of resinous material having a smooth surface, a foraminous sheet between said second and third portions substantially completely overlying the interface between said portions, said sheet being free from wrinkles or bubbles, said sheets being of considerably less thickness than the thickness of the portions, said three portions having mineral particles intermixed therein to the extent of 60% to 90% by volume of such portion, and a plurality of mineral chips embedded in the outer surface of said third portion.

3. The method of making a massive panel construction which comprises utilizing resinous material intermixed with filler particles to form a dough-like mass with the particles being of 60% to 90% by volume of the mass, placing a first portion of said material in a form, mechanically working said material to define a layer having a smooth exposed surface, laying a foraminous sheet onto said surface to substantially completely overlie the surface, smoothing said sheet to remove any wrinkles or bubbles, placing a second portion of said dough-like material over the first layer, placing a body of rigid foamed material on said second portion, placing a third portion of said dough-like material over said body of rigid foamed material and onto said second portion to encase the body of rigid foamed material, mechanically working said second and third portions to define another layer having a smooth exposed surface, laying a foraminous sheet onto said surface to substantially completely overlie the surface, smoothing said sheet to remove any wrinkles or bubbles, and applying additional like resinous material onto said sheet.

References Cited

UNITED STATES PATENTS

| | | | |
|---|---|---|---|
| 2,751,775 | 6/1956 | Sergovic. | |
| 2,752,275 | 6/1956 | Raskin et al. | |
| 2,794,756 | 6/1957 | Lenerenz | 161—43 |
| 3,150,032 | 9/1964 | Rubenstein | 161—5 XR |
| 3,197,352 | 7/1965 | Coates | 156—242 |
| 3,232,017 | 2/1966 | Prusinski et al. | 52—309 |
| 3,298,894 | 1/1967 | Barnette | 161—43 |

ROBERT F. BURNETT, Primary Examiner

R. O. LINKER, Jr., Assistant Examiner

U.S. Cl. X.R.

52—309; 156—242; 161—161, 162; 264—71, 255